J. W. B. LADD AND R. E. RICH.
CRANK SHAFT TRANSMISSION PULLEY.
APPLICATION FILED APR. 21, 1919.

1,341,914.

Patented June 1, 1920.

Witnesses:

Inventors,
John W. B. Ladd
Ralph E. Rich
By Frank D. Thomason Atty.

UNITED STATES PATENT OFFICE.

JOHN W. B. LADD AND RALPH E. RICH, OF CHICAGO, ILLINOIS.

CRANK-SHAFT TRANSMISSION-PULLEY.

1,341,914.      Specification of Letters Patent.      Patented June 1, 1920.

Application filed April 21, 1919. Serial No. 291,635.

*To all whom it may concern:*

Be it known that we, JOHN W. B. LADD and RALPH E. RICH, citizens of the United States, residing at Chicago, in the county of Cook and State of Illinois, have invented new and useful Improvements in Crank-Shaft Transmission-Pulleys, of which the following is a full, clear, and exact description.

Our invention relates to the pulley on the forward end of the crank-shaft of internal combustion engines, through the medium of which the engine is cranked.

Heretofore the crank-shaft of internal combustion engines of automobiles projected forward beyond its bearings in the heads of the casing but a very short distance and had a fan-pulley thereon, the rear of which was closed and was removed such a short distance that there was not space enough on the said shaft between the boss of the pulley and its bearings for a gear or sprocket to be mounted thereon for driving any equipment which the owner of the automobile might desire to install. This fan-pulley was secured to the forward extended end of the crank-shaft by a transverse pin, which was inserted through its hub and through a transaxial opening in said shaft, and, as it would be both awkward and costly to drill new holes in the said forwardly extending end thereof, said transaxial opening and said pin must be utilized to secure any improved substitute pulley that may be devised to provide the necessary space between the pulley and the adjacent head of the engine, for the mounting of a gear or sprocket on said shaft pulley boss. In the absence of a self starter the engine is started by pushing rearwardly on and turning the hand-crank projecting out beyond the front of the automobile and causing a clutch-head on the rear end of the starter-shaft to enter the open front side of the pulley and engage the end portions of the pin projecting beyond the boss of said pulley. In view of this fact, the web cannot be moved forward, as it would then interfere with the clutch head engaging the pin, and the pin cannot be moved without drilling a new hole in the engine crank-shaft which besides weakening the shaft is impracticable for the reasons heretofore stated.

The objects of our invention are to provide a substitute pulley which is so constructed as to make it possible to move the pulley forward on the crank-shaft without changing the position of the pin connecting the original pulley to the shaft; to continue to engage the pin with the axially alining clutch-head of the starter-shaft, the same as heretofore; to provide space for the introduction of a gear or sprocket or other power transmission device for operating an air pump, or water pump or other equipment desired by the owner of the automobile and to protect the pulley belt from said gear or sprocket. These objects we accomplish by the means hereinafter fully described, and as particularly pointed out in the claims.

Figure 1:
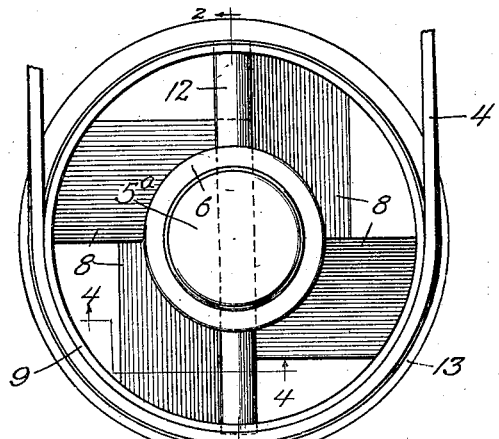
Figure 1 is a view looking at the front end of the crank-shaft of the engine showing our improved pulley mounted thereon.
Figure 4:
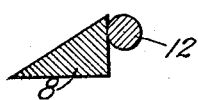
Fig. 4 is a cross-section of said pulley taken on dotted line 4—4, Fig. 1.
Figure 2:
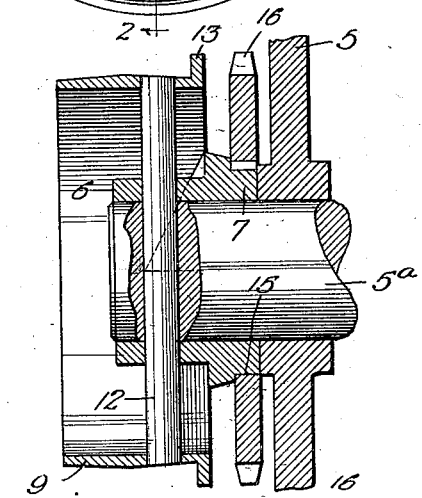
Fig. 2 is a longitudinal central section on line 2, 2 of Fig. 1 thereof showing a fragment of the crank casings.
Figure 3:
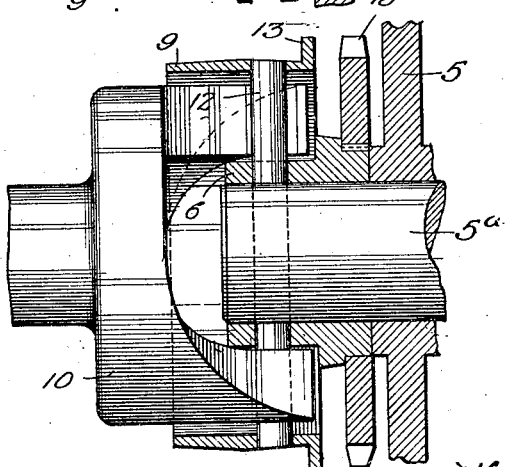
Fig. 3 is a view similar to Fig. 2 showing the said pulley engaged by the clutch-head of the hand-crank shaft.

Referring to the drawings, 5 represents the broken away forward end of the casing of an internal combustion engine, and 5$^a$ the projecting forward end of the crank-shaft journaled therein. Our improved pulley, consisting of a cylindrical boss 6, rear extension thereof 7, spokes 8, 8, and rim 9, is securely mounted on said shaft. Rim 9 is concentric to boss 6 and is connected thereto by four spokes 8, which latter, preferably, extend tangentially from the boss and are triangular or other shape in cross-section.

The pulley is secured to the forward end of crank-shaft 5$^a$ by means of a transverse pin 12, which extends through the same transverse hole in the end of the shaft that was originally made to receive the pin that fastened the original pulley, that was on said shaft when the automobile came out of the factory. The ends of this pin, preferably, extend to the inner circumference of the rim, and are designed to be engaged by the teeth or other projections on the adjacent end of the clutch-head 10 of the starter shaft when it is desired to start the engine. The spokes 8, 8, are disposed in the same transverse plane as said pin, and may be made of any shape in cross-section that will allow the clutch-head to engage with the pin, the spokes and pin, or the spokes. We prefer, however, to have the clutch-head engage the ends of the pin and to shape the spokes triangular in cross-section, and to locate the holes in the boss of the pulley so that the ends of said pin will be backed up by the flat side edges of said spoke, although this is not absolutely necessary. When, however, the spokes are relied upon to reinforce the ends of the pin, two oppositely disposed triangular spokes are made narrower so as to afford the necessary clearance for the pin.

The periphery of rim 9 inclines slightly from its center of width to its side edges and the rear edge thereof is provided with an outwardly projecting circumferential flange 13, which absolutely prevents belt 4 from slipping to the rear.

The rear extension 7 of the boss, immediately back of the spokes, is, preferably, of greater diameter than that of the forward cylinder, hereinbefore described, and the rear end of said extension is rabbeted, as at 15, to provide a seat for a gear or sprocket 16 that drives some piece of mechanism such as air-pump, water-pump or self-starter (not shown). This rabbet 15 is such a distance from the pulley that when locked in its seat it cannot interfere with the same. The gear or sprocket 16 may be cast in one piece with the pulley and its boss, hereinbefore described, but we prefer to make them separate and assemble them, substantially as shown. The casting of the pulley in one piece of metal; the inserting of pin 12 in place and the seating and locking or casting of gear 16 on rear extension 7, involves no more labor than heretofore required to assemble the similar unimproved parts of the old style pulley and the additional cost of the material employed in making my improved pulley is, comparatively speaking, nothing, considering the advantages obtained.

What we claim as new is:

1. In a device of the class described the combination of a shaft having a transverse hole therein located a predetermined distance from the end of said shaft, a pulley comprising a boss having diametrically opposite holes therein, a concentric rim, spokes connecting said boss and rim, a pin passing through the holes in the boss and shaft and extending toward the rim in the same plane as said spokes, and a gear connected to said pulley.

2. In a device of the class described the combination of a shaft having a transverse hole therein located a predetermined distance from the end thereof, a pulley comprising a boss having diametrically opposite holes therein, a concentric rim, spokes connecting said boss and rim, a pin passing through the holes in the boss and shaft and extending toward the rim to the same plane as said spokes, said boss extending to the rear of the plane of the rear edge of the rim, and a gear connected to said rear extension of the boss.

3. In a device of the class described the combination of a shaft having a transverse hole therein located a predetermined distance from the end thereof, of a pulley comprising a boss having diametrically opposite holes therein, a concentric rim, spokes connecting said boss and rim, a pin passing through the holes in the boss and shaft and extending toward the rim in the same plane as said spokes; said boss extending to the rear of the edges of the rim and rabbeted, a gear seated in said rabbet and secured to said extension.

4. In a device of the class described the combination of a shaft having a transverse hole therein located a predetermined distance from the end thereof, of a pulley of the kind specified comprising a boss having a rearward extension, a rim concentric thereto, spokes connecting said rim and boss that are triangular in cross-section, a transverse pin that passes through the hole in said shaft and boss in the same plane as the spokes and has its ends extending beyond said boss toward said rim; and a gear mounted on and supported upon said rearward extension.

5. In a device of the class described the combination of a shaft having a transverse hole therein located a predetermined distance from said head, of a pulley of the kind specified comprising a boss having a rearward extension, a rim concentric thereto the rear edge of the periphery of which has an outwardly projecting circumferential flange, spokes that are triangular in cross-section connecting said boss and rim, a transverse pin passing diametrically through the hole in said shaft and said boss in the same plane as said spokes and having its ends extending beyond said boss toward said rim, and an integral gear spaced apart from said rearward extension.

6. In a device of the class described the combination of a shaft having a transverse hole therein located a predetermined distance from the end thereof, of a pulley of the kind specified comprising a boss having a rearward extension, the rear of which is rabbeted circumferentially, a rim concentric thereto the rear edge of which has an outwardly projecting circumferential flange, spokes projecting from said boss and connecting said rim thereto, a transverse pin passing diametrically through the hole in said shaft and said boss whose ends extend toward the rim in the same plane as said spokes and are adapted to secure the same to the shaft, and a gear spaced apart from and seated and secured in the rabbeted end of said rearward extension.

7. In a device of the class described the combination of a shaft having a transverse hole therein located a predetermined distance from the end thereof, of a pulley of the kind specified comprising a boss having a rearward extension, a rim concentric thereto the rear edge of the periphery of which has an outwardly projecting circumferential flange, spokes that are triangular in cross-section projecting from said boss and connecting said rim thereto, a transverse pin passing diametrically through the hole in said shaft and said boss in the same plane as said spokes and having its ends extended beyond said boss and bearing against the widest edges of two oppositely disposed spokes, and a gear spaced apart from said rim and secured to said rearward extension.

8. In a device of the class described the combination of a shaft having a transverse hole therein located a predetermined distance from the end thereof, of a pulley of the kind specified comprising a boss having a rearwardly extension whose rear end is rabbeted circumferentially, a rim concentric thereto the rear edge of which has an outwardly projecting circumferential flange, spokes that are triangular in cross-section projecting from said boss and connecting said rim thereto, a transverse pin passing diametrically through the hole in said shaft and through said boss in the same plane as the spokes and having its ends extended beyond said boss and bearing against the widest edges of two oppositely disposed spokes, and a gear or sprocket spaced apart from and secured to said rearward extension.

9. In a device of the class described the combination of a shaft having a transverse hole therein located a predetermined distance from the end thereof, of a pulley of the kind specified comprising a boss having a rearward extension the rear end of which is circumferentially rabbeted, a rim concentric thereto the rear edge of the periphery of which has an outwardly projecting circumferential flange, spokes that are triangular in cross-section and project tangentially from said boss and connecting said rim thereto; two diametrically opposite spokes being narrower than the rest, a transverse pin that passes diametrically through the hole in said shaft and said boss in the transverse plane of the spokes and having its ends extended beyond said boss toward said rim and bearing against the wider edges of the said narrower spokes, and a gear spaced apart from said rim and secured and seated in the rabbeted end of said extension.

10. In a device of the class described the combination of a crank shaft having a transverse hole located at a predetermined point in the end thereof, a pulley and a gear alongside of said pulley and made integral therewith, a boss for said pulley, spokes connecting said boss and the rim of the pulley, and a pin extending through said spokes and through said transverse hole and having its ends extending through said boss toward said rim.

11. In a device of the class described the combination of a crank-shaft having a transverse hole located at a predetermined point in the end thereof, of a combined pulley and gear, the former including a rim, spokes and boss, and a pin passing through said boss and said transverse hole in the plane of said spokes and having its ends extending beyond said boss toward said rim.

In witness whereof we have hereunto set our hands this 31st day of March, 1919.

JOHN W. B. LADD.
RALPH E. RICH.

Witnesses:
 MARION BOLTE,
 ARCH. N. CAMPBELL.